United States Patent [19]

Gilreath

[11] 3,841,373

[45] Oct. 15, 1974

[54] PNEUMATIC TIRE

[75] Inventor: Arnold A. Gilreath, Detroit, Mich.

[73] Assignee: Uniroyal, Inc., New York, N.Y.

[22] Filed: Mar. 8, 1973

[21] Appl. No.: 339,481

[52] U.S. Cl. .............................. 152/209 B, 152/352
[51] Int. Cl. ............................................. B60c 13/00
[58] Field of Search......... 152/209 R, 330, 352, 353

[56] References Cited
UNITED STATES PATENTS

| | | | |
|---|---|---|---|
| 2,113,527 | 4/1938 | Hale................................. | 152/209 R |
| 2,199,466 | 5/1940 | McRaven........................... | 152/353 |
| 2,572,259 | 10/1951 | Gottschall.......................... | 152/353 |
| 2,685,904 | 8/1954 | Brandau............................ | 152/353 |
| 2,865,423 | 12/1958 | Renaud.............................. | 152/353 |
| 2,869,610 | 1/1959 | Lippmann et al................... | 152/361 |
| 3,457,981 | 7/1969 | Verdier............................. | 152/209 B |
| 3,467,159 | 9/1969 | Semonin............................ | 152/209 R |

*Primary Examiner*—Drayton E. Hoffman
*Attorney, Agent, or Firm*—Charles A. Blank, Esq.

[57] ABSTRACT

A pneumatic tire having an annular rib integral with the sidewall and displaced inwardly from the shoulder of the tire. The region of maximum lateral projection of the rib is displaced radially outwardly from region of maximum width, exclusive of the rib, of the tire under load and extends outwardly of the tire at least as far as the region of maximum width of the tire under load. The annular rib provides sidewall protection without contributing to heat build-up in the shoulder region.

8 Claims, 3 Drawing Figures

3,841,373

PNEUMATIC TIRE

This invention relates to pneumatic tires and, more particularly, to pneumatic tires of the type adapted for off-the-road use such as under service conditions on a rocky surface. The invention is also applicable to pneumatic tires, particularly radial ply tires, which are used on highways but are subject to occasional impacts on the sidewalls which can cause sidewall damage.

One prior off-the-road tire utilizes ridges and grooves at the shoulders of the tire and projecting therefrom to provide a degree of protection from sidewall damage due to rocks or the like over which the tire is used. Such a tire has the disadvantage that the ridges contribute to heat build-up in the shoulder regions of the tire and can result in tire failure.

Another prior tire adapted for use on aircraft has a sidewall rib for deflecting water splashed by the tire. The rib is positioned, however, at the position of the maximum width, exclusive of the rib, of the tire under load and at this position the rib is subject to continuous lateral movement which can cause the rib to shear off the sidewall.

It is an object of the present invention, therefore, to provide a new and improved pneumatic tire which avoids the above-mentioned disadvantages of prior such tires.

It is another object of the invention to provide a new and improved pneumatic tire adapted for off-the-road use which provides sidewall protection from damage by rocks and the like without excessive heat build-up in the shoulder region of the tire.

In accordance with the invention a pneumatic tire comprises sidewalls, shoulders and a tread. At least one sidewall has an annular rib integral therewith projecting laterally from the sidewall and having its radially outer surface displaced radially inwardly from the shoulder of the tire under load and having its region of maximum lateral projection displaced radially outwardly from the region of maximum width, exclusive of the rib, of the tire under load. The region of maximum lateral projection of the rib extends outwardly of the tire at least as far as the region of maximum width, exclusive of the rib, of the tire under load.

Referring now more particularly to the drawings.

For a better understanding of the present invention, together with other and further objects thereof, reference is made to the following description, taken in connection with the accompanying drawings, and its scope will be pointed out in the appended claims.

Figure 1:
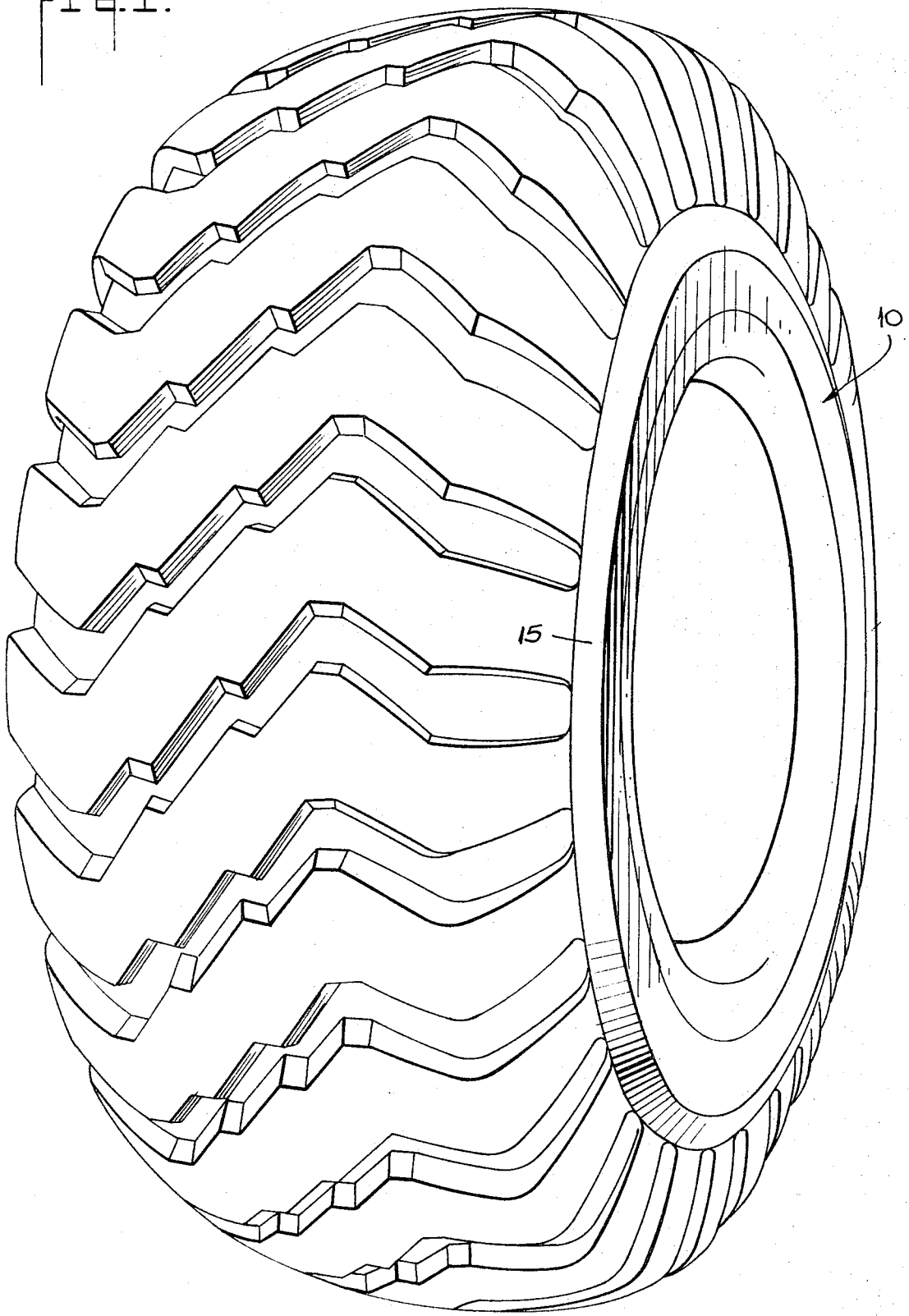
FIG. 1 is a perspective view of a tire constructed in accordance with the invention when uninflated.
Figure 2:
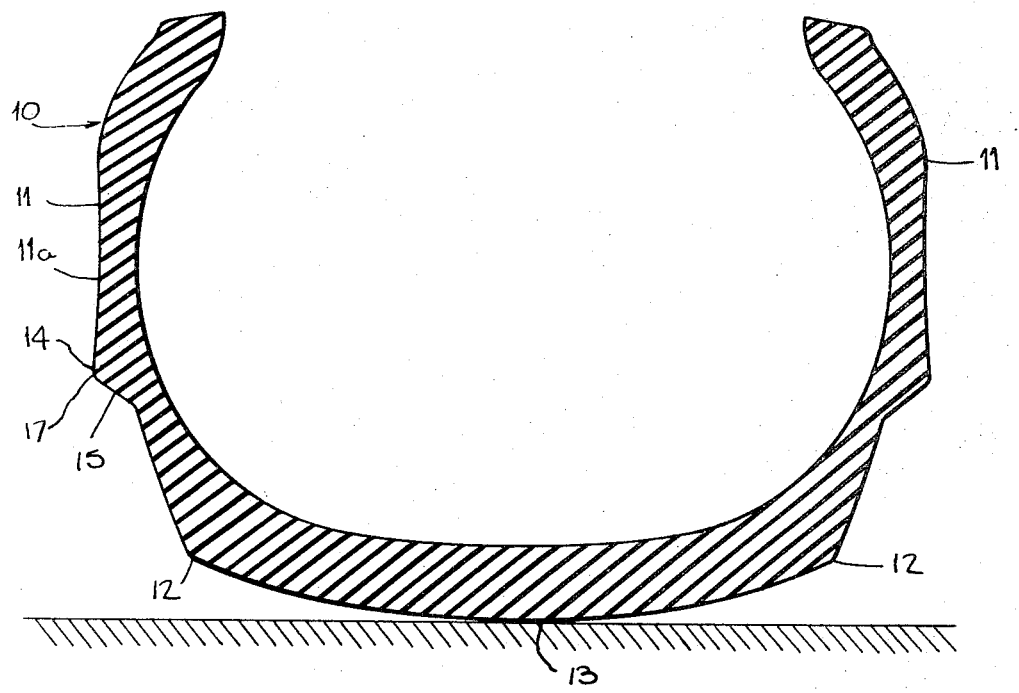
FIG. 2 is a cross-sectional view of the FIG. 1 tire when inflated but unloaded.
Figure 3:
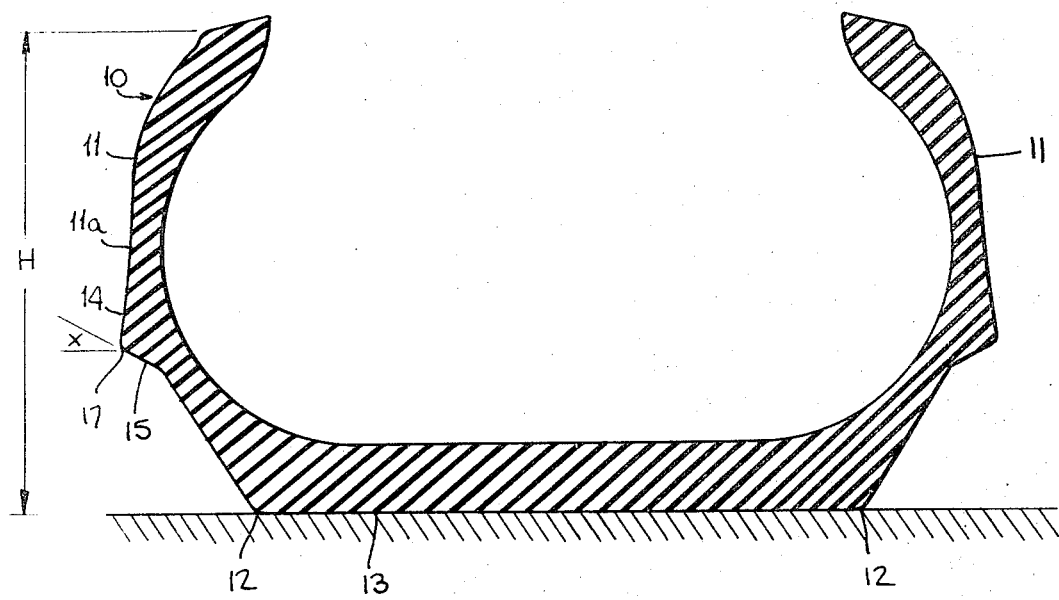
FIG. 3 is a cross-sectional view of the FIG. 1 tire when inflated and under rated load.

Referring now more particularly to FIGS. 1, 2 and 3 of the drawings, a pneumatic tire in accordance with the invention comprises sidewalls 11, shoulders 12, and a tread 13. The pneumatic tire represented as a preferred example in the drawings is a tire adapted for use off the road and is of the radial ply type. At least one sidewall 11 has an annular rib 14 integral therewith projecting laterally from the sidewall 11 and having its radially outer surface 15 displaced radially inwardly from the shoulder of the tire under load. The rib 14 has its region of maximum lateral projection 17 displaced radially outwardly from the region of maximum width 11a, exclusive of the rib 14, of the tire 10 under load. The tire 10 has ribs and grooves extending transversely with respect to the circumference of the tire and extending over the shoulders 12 approximately to the radially outer surface 15 of the rib 14, as most clearly represented in FIG. 1. The radially outer surface 15 of the rib is inclined with respect to the rotational axis of the tire at an angle $(x)$ in the range of 10° to 50° when the tire is under load and preferably at an angle of approximately 30°. Within this range of angles and preferably with a 30° angle, the rib 14 is effective to deflect rocks away from the sidewall and to minimize sidewall damage from rocks or other impacts. However, if the angle is less than 10°, the tire has a tendency to climb rather than deflect rocks, which increases tire damage.

The region 17 of maximum lateral projection of the rib extends outwardly of the tire, when loaded, beyond the region 11a of maximum width exclusive of the rib, of the tire, when loaded, by an amount in the range extending from zero to a maximum of ½ inch and preferably by an amount which is approximately ¼ inch. The region of maximum lateral projection 17 of the rib extends outwardly of the tire at least as far as the region 11a of maximum width, exclusive of the rib 14, of the tire under load.

The region of maximum lateral projection 17 of the rib 14 is spaced radially from the radially outermost surface of the tread 13 when the tire is loaded by a distance in the range of 20 to 45% of the cross-sectional height of the tire when loaded and preferably by a distance which is approximately 28% of the cross-sectional height H of the tire when loaded. The cross-sectional height of the tire when loaded may be, for example, approximately twenty-five inches.

The load conditions for the tire are the rated load conditions as defined by the Tire and Rim Association, Inc., Akron, Ohio. The rib 14 is preferably of high modulus, steel-reinforced rubber stock containing randomly dispersed ½ inch filaments of steel. Other suitable reinforcing materials, for example, floc, fiber or glass filaments may be used or the rib may contain no reinforcements.

With the rib positioned as described, the tire can operate on rough terrain without excessive heat build-up in the shoulder regions. Also, with the height of the rib in the range of up to ½ inch beyond the region 11a of maximum width exclusive of the rib, of the tire under load, heat build-up in localized spots under the rib is avoided.

The protective rib 14, may be molded with the tire or may be applied to the tire in any other suitable manner such as, for example, strip winding prior to curing. The rib may also be applied to a tire which has already been cured as a strip of rubber and then suitably cured. As represented in the drawings, there preferably is a protective rib on each sidewall of the tire, but for some applications it may be suitable to provide a protective rib on only one sidewall of the tire.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pneumatic tire comprising sidewalls, shoulders and a tread, at least one sidewall having an annular rib integral therewith projecting laterally from the sidewall and having its radially outer surface displaced radially inwardly from the shoulder of the tire under load and having its region of maximum lateral projection displaced radially outwardly from the region of maximum width, exclusive of said rib, of the tire under load, said region of maximum lateral projection of said rib extending outwardly of the tire at least as far as the region of maximum width, exclusive of said rib, of the tire under load, and said radially outer surface of said annular rib being inclined with respect to the axis of the tire at an angle in the range of ten to fifty degrees when the tire is under load.

2. A pneumatic tire in accordance with claim 1 in which said tread has ribs and grooves extending transversely with respect to the circumference of the tire and extending over said shoulders approximately to said radially outer surface of said rib.

3. A pneumatic tire in accordance with claim 1 in which said angle is approximately thirty degrees.

4. A pneumatic tire in accordance with claim 1 in which said region of maximum lateral projection of said rib extends outwardly of the tire, when loaded, beyond the region of maximum width of the tire, when loaded, exclusive of said rib, by an amount in the range extending to a maximum of one-half inch.

5. A pneumatic tire in accordance with claim 4 in which said amount is approximately one-quarter inch.

6. A pneumatic tire in accordance with claim 1 in which said region of maximum lateral projection of said rib is spaced radially from the radially outermost surface of said tread when the tire is loaded by a distance in the range of twenty to forty-five percent of the cross-sectional height of the tire when loaded.

7. A pneumatic tire in accordance with claim 6 in which said distance is approximately twenty-eight percent of the cross-sectional height of the tire when loaded.

8. A tire in accordance with claim 1 in which said rib contains randomly dispersed steel filaments.

* * * * *